United States Patent [19]

Hager

[11] E Re. 29,036

[45] Reissued Nov. 16, 1976

[54] LUGGAGE TRANSPORT STRUCTURE

[76] Inventor: Robert G. Hager, 219 Aderno Way, Pacific Palisades, Calif. 90272

[22] Filed: Aug. 20, 1975

[21] Appl. No.: 606,371

Related U.S. Patent Documents

Reissue of:

[64] Patent No.: 3,799,568
Issued: Mar. 26, 1974
Appl. No.: 271,966
Filed: July 14, 1972

[52] U.S. Cl. ..... 280/37; 190/18 A
[51] Int. Cl.[2] ..... B62B 1/12
[58] Field of Search ..... 280/37, 47.24, 47.26, 280/35; 190/18 A, 18 R

[56] References Cited

UNITED STATES PATENTS

| | | | |
|---|---|---|---|
| 324,617 | 8/1885 | Walsh | 280/37 |
| 1,028,178 | 6/1912 | Batchelor | 280/37 X |
| 2,463,713 | 3/1949 | Partiot | 280/37 |
| 2,472,491 | 6/1949 | Quinton | 280/37 |
| 2,510,754 | 6/1950 | Norlin | 190/18 A |
| 2,925,283 | 2/1960 | Stilger | 280/37 |
| 3,400,942 | 9/1968 | Hull | 280/35 |
| 3,606,372 | 9/1971 | Browning | 190/18 A |

*Primary Examiner*—Trygve M. Blix
*Assistant Examiner*—Reinhard J. Eisenzopf

[57] ABSTRACT

A luggage transport structure for use with a suitcase having wheels mounted thereon for supporting said suitcase. A channel is formed on the outer periphery of the suitcase and a housing positioned on the interior of the suitcase adjacent a portion of the channel. A handle is positioned in the housing which is retractable and extendable out of the housing. When the handle is extended from the suitcase it can be used to roll the suitcase along a floor. In its retracted position the handle is positioned within the channel and is flush with the outer dimensions of the suitcase.

8 Claims, 7 Drawing Figures

LUGGAGE TRANSPORT STRUCTURE

Matter enclosed in heavy brackets [ ] appears in the original patent but forms no part of this reissue specification; matter printed in italics indicates the additions made by reissue.

BACKGROUND OF THE INVENTION

1. Field of the Invention

The field of art to which the invention pertains includes the field of luggage transports, particularly with respect to a wheel equipped suitcase having a handle which is retractable and extendable out of the suitcase for transporting the suitcase.

2. Description of the Prior Art

The best prior art is found in the U.S. Pat. Nos. 362,868; 2,439,660; 2,613,950; 2,817,538; 3,163,268; and 3,653,474.

The use of large molded plastic luggage when fully loaded normally requires the aid of a dolly truck or the like to pick up or move such luggage. In those areas throughout the world where bell-hops, sky-caps and the like are not readily available it becomes impractical for a traveler to use such luggage although the capacity thereof is normally needed. One suggestion to overcome the difficulty of moving such luggage has been the incorporation of wheels formed flush with the suitcase or mounted temporarily on the exterior of the suitcase. A gripping mechanism is normally provided which enables the traveler to roll the luggage to a desired location. However, such gripping mechanisms have been found to protrude from the luggage and when loaded onto an airplane or some other form of transportation the gripping mechanism can be damaged. In addition, such a gripping mechanism is normally esthetically unpleasing. Moreover, prior art types of gripping mechanisms have been normally fixedly positioned adjacent the luggage so that the traveler has difficulty gripping the luggage when attempting to roll the luggage on the floor.

SUMMARY OF THE INVENTION

The present invention provides a handle which is used in transporting a suitcase having wheels mounted thereon. The handle is extendable out of a housing formed in the suitcase when the suitcase is rolled. When the handle is not being used to roll the suitcase, the handle is retracted into the housing and the gripping portion of the handle is flush with the outer surface of a channel formed on the suitcase outer surface. The handle thus conforms to the exterior appearance of the luggage and therefore may not be damaged during tranportation of the luggage. In addition, the handle is esthetically pleasing. The handle is adjustably extendable to various positions so as to enable different height people to utilize the suitcase.

DESCRIPTION OF THE PREFERRED EMBODIMENTS

Figure 1:
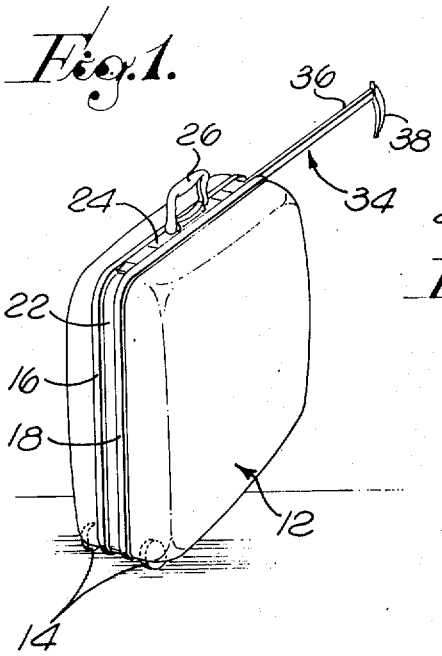
FIG. 1 is a perspective view of the luggage structure having the handle shown in an extended position in accordance with the present invention.
Figure 4:
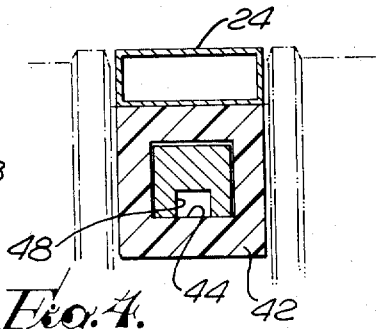
FIG. 4 is a cross-sectional view of the luggage structure of FIG. 2 taken about the lines 4—4 of FIG. 2.
Figure 6:
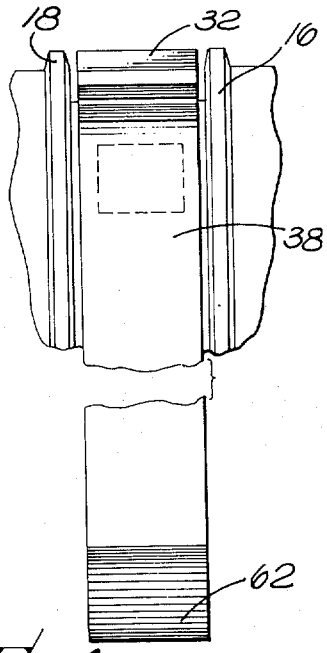
FIG. 6 is an end view of the luggage structure taken along the lines 6—6 of FIG. 2.
Figure 5:
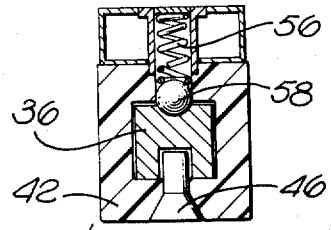
FIG. 5 is a cross-sectional view of the luggage structure of FIG. 2 taken about the lines 5—5 of FIG. 2.

Referring now to the drawings, there is shown in FIG. 1 a perspective view of a preferred embodiment of the luggage structure. The luggage structure comprises a conventional suitcase 12 which has been modified to include a pair of wheels 14 at one corner thereof. The wheels are provided in a recess which may be formed during the molding operation in each of the corners of the luggage. Alternatively, the suitcase could be a conventional suitcase which has been modified after manufacture to include the wheels 14 therein. Such a structure is typically shown in U.S. Pat. No. 3,163,268 and forms no part of this invention.

Positioned along the entire periphery of the suitcase are a pair of metal members 16 and 18 which are normally made of magnesium and are spaced apart to define a generally U-shaped channel 22 therebetween which is recessed into the luggage. Normally each of the members 16 and 18 are formed on hinged halves of the suitcase. Positioned in the channel 22 on the top of the suitcase is a metal support 24 whose top surface is normally flush with the outer edges of the metal members 16 and 18. As can be seen in greater detail in FIG. 2 the metal support 24 is normally utilized to form a support for a carrying handle 26. In addition, conventional latches 28 and 32 are positioned on either end of the support 24. The latches which normally contain a locking mechanism, are utilized to open and close the suitcase.

A handle structure 34 which is extendable and retractable into the suitcase is formed of a rod portion 36 and a gripping portion 38. An enclosed housing member 42 having a generally rectangular opening 44 therein is positioned within the suitcase with the top surface thereof abutting the bottom surface of the support 24. Normally the member 42 may be formed of extruded plastic so as to minimize the total weight of the suitcase. The handle structure is extendable from the suitcase at a point diagonally opposite the wheels 14 so as to enable the suitcase to be held at the portion 38 and pivoted so that the suitcase rests entirely on the wheels 14.

To limit outward movement of the handle structure from the suitcase a stop 46 extends into the opening 44 at a point near the handle 26. The rod portion 36 of the handle structure contains a generally U-shaped slot 48 which enables the handle structure to extend outwardly from the suitcase until an end wall 52 of the rod portion 36 is reached. The end wall 52, which is formed on the end of the rod portion opposite the gripping portion 38 abuts the stop 46 preventing further extension of the handle from the suitcase.

Figure 2:
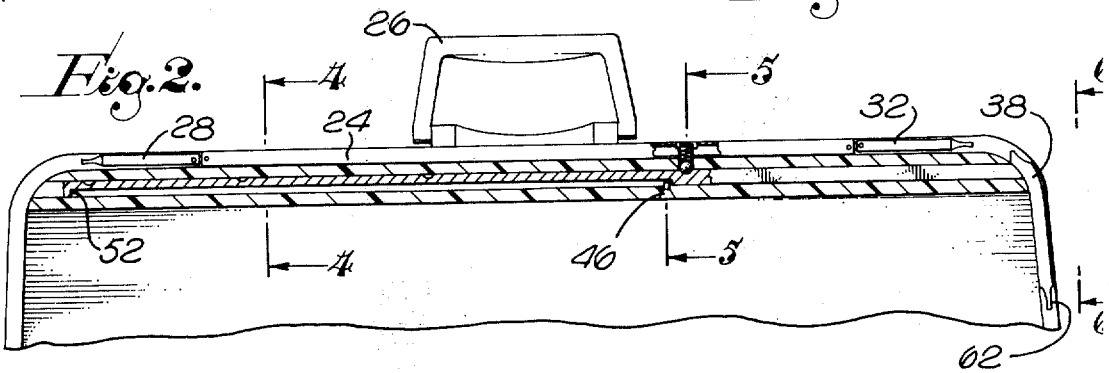
FIG. 2 is a side view, partly in section, of a portion of the luggage structure showing the handle in a retracted position.
Figure 3:
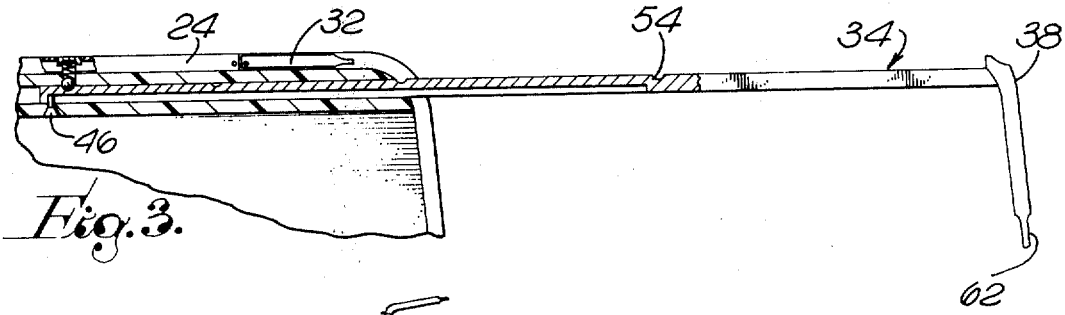
FIG. 3 is a partial sectional side view of the luggage structure of FIG. 2 with the handle shown in an extended position.

The rod portion 36 top surface contains spaced depressions 54. These depressions interact with a detent mechanism formed of a spring member 56 and a ball 58 positoned in the support 24 which protrudes through the top of the housing member 42 into the opening 44. The ball 58 will rest in the depressions 54 enabling the handle structure to be positioned in a predetermined extendable position. Normally, the position of the handle is chosen by weight of the suitcase as well as the height of the person transporting the suitcase. Thus, it is normally necessary to provide a plurality of depressions 54 so as to enable the desired position of the handle structure to be chosen. When the handle structure is in the fully retracted position as shown in FIG. 2 the gripping portion 38 of the handle is positioned between the adjacent metal members 16 and 18 and is positioned in the channel 22. It should be noted that the outer surface of the gripping portion 38 is flush with the outer surface of the member 16 and 18. In addition, the bottom of the gripping surface 38 contains a tapered portion 62 into which a finger may be inserted when the handle structure is in the fully retracted position so as to enable the handle structure to be extended when desired.

Figure 7:
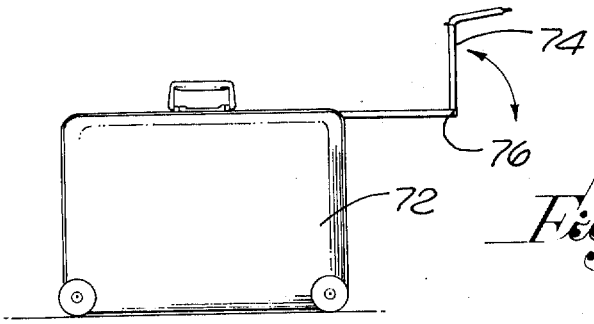
FIG. 7 is a perspective view of an alternative arrangement of the luggage structure of FIG. 1.

Referring to FIG. 7 there is shown an alternative embodiment of the invention. For unusually large suitcases it may be found necessary, especially when extremely heavy loads are carried in the suitcase or when the individual using the suitcase does not have sufficient strength, to provide wheels at all four bottom corners of the suitcase as shown in FIG. 7. The suitcase 72 of FIG. 7 contains a handle structure 74 which is constructed of a similar structure as that shown in FIG. 1. In addition, however, a hinge 76 is formed on the rod portion enabling the handle to be swiveled 90°. Thus, when the suitcase is rolled on all four wheels as shown in FIG. 7 the rod portion is pivoted upwardly 90° enabling a person to grip the handle and move it along the floor. When it is desired to retract the handle into the suitcase, the hinge 76 is released and the handle is then retracted into the suitcase in a similar manner as that shown in FIG. 2.

Alternatively, a locking pin could be provided to lock the handle in the retracted position, or in one of the plurality of extended positions. It should be noted the locking pin mechanism could also be made flush with the channel 22 to provide a smooth exterior surface.

It should be noted that if the handle structure is allowed to extend a large distance from the suitcase, with heavy loads and a weak handle structure, failure of the rod portion could occur. The handle structure could be made of a lightweight metal such as magnesium which will provide maximum strength with a minimum of additional weight being added to the suitcase. However, the metal chosen together with the maximum weight to be carried by the suitcase, will be a determining factor in designing the maximum distance that the handle can be extended.

I claim:

1. In combination with a container such as a suitcase having wheels mounted thereon for supporting said suitcase and being rotatable with respect to said suitcase;

a U-shaped channel formed on the outer periphery of said suitcase, said U-shaped channel being formed of a pair of spaced apart metal members extending outwardly in parallel planes and in a plane perpendicular to the plane of the outer periphery of said suitcase;

a housing member on the interior of said suitcase adjacent said channel; and a handle structure including a gripping portion positioned in said housing member, said handle structure being retractable into and extendable out of said housing member, said handle when extended being used to transport said suitcase, said gripping portion when retracted being positioned entirely within said U-shaped channel.

2. The combination in accordance with claim 1 wherein a support member is positioned adjacent a portion of said U-shaped channel, said support member containing an outer surface extending in a plane perpendicular to the plane of said metal members and wherein said housing member is secured to said suitcase adjacent a portion of said metal support member.

3. A combination in accordance with claim 2 wherein said U-shaped channel is recessed into said suitcase structure.

4. The combination in accordance with claim 3 wherein said suitcase is formed of a pair of hinged halves, one of said metal members being secured to one of said suitcase hinged halves.

5. The combination in accordance with claim 1 wherein said handle structure is tapered at a free edge thereof, facilitating gripping of said handle structure when said handle is in said retracted position.

6. The combination in accordance with claim 1 wherein said handle structure is curved to conform to the shape of said U-shaped channel at a corner of said suitcase.

*7. In combination with a container, such as a suitcase, having wheels mounted thereon for supporting said suitcase and being rotatable with respect to said suitcase:*

*a U-shaped channel secured to at least a portion of the periphery of said suitcase, said U-shaped channel comprising a pair of spaced-apart members extending outwardly in parallel planes and in a plane substantially perpendicular to a plane of the outer periphery of said suitcase;*

*a housing member connected to said channel; and,*

*a handle structure including a gripping portion, said handle structure being retractable to said housing member to temporarily secure said handle to said housing member and extendable from said housing member to transport said suitcase, said gripping portion when retracted being positioned substantially within said U-shaped channel to present a smooth exterior contour in combination with said spaced-apart channel members.*

*8. In combination with a suitcase having a rigid center frame and having wheels mounted thereon for supporting said suitcase and being rotatable with respect to said suitcase:*

*an elongated, U-shaped rigid channel secured to at least a portion of the periphery of said suitcase substantially along a medial plane of said suitcase, said U-shaped channel comprising a pair of spaced-apart members extending outwardly in substantially parallel planes and in a plane substantially perpendicular to a plane of the outer periphery of said suitcase;*

*retaining means substantially within said channel; and,*

*a handle structure including a gripping portion, said handle structure being retractable to and extendable from said channel, said handle when extended being used to transport said suitcase by the transmission of forces through said rigid member to said suitcase, said gripping portion when retracted being positioned substantially within said channel to present a smooth exterior contour in combination with said spaced-apart channel members.*

* * * * *